United States Patent [19]
Fuchs, Jr.

[11] 3,766,934
[45] Oct. 23, 1973

[54] PRESSURE REGULATOR

[75] Inventor: Francis Joseph Fuchs, Jr., Princeton Junction, N.J.

[73] Assignee: Western Electric Company, Incorporated, New York, N.Y.

[22] Filed: June 17, 1971

[21] Appl. No.: 154,153

Related U.S. Application Data

[63] Continuation of Ser. No. 769,935, Oct. 23, 1968, said Ser. No. 578,278.

[52] U.S. Cl............ 137/116.3, 137/85, 137/505.13
[51] Int. Cl. ......................................... F16r 31/363
[58] Field of Search...................... 137/85, 102, 115, 137/116.3, 503, 505.13; 91/385

[56] References Cited
UNITED STATES PATENTS

| | | | |
|---|---|---|---|
| 1,737,428 | 11/1929 | Mecur | 137/116.3 |
| 3,106,094 | 10/1963 | Gallo | 91/385 X |
| 3,225,619 | 12/1965 | Schaefer | 137/116.3 X |
| 3,374,803 | 3/1968 | Leveque | 137/503 |
| 3,378,028 | 4/1968 | Mosher | 137/503 X |

*Primary Examiner*—Robert G. Nilson
*Assistant Examiner*—Robert G. Nilson
*Attorney*—Jack Schuman

[57] ABSTRACT

Pressure regulator for maintaining a predetermined ratio between an output pressure of the pressure regulator, or the pressure in an operational system to be served, and an input or source pressure to the regulator, regardless of variations in either or both the input or the output pressures. The ratio of output pressure to input pressure is selectively variable between 0 and 100 percent.

17 Claims, 11 Drawing Figures

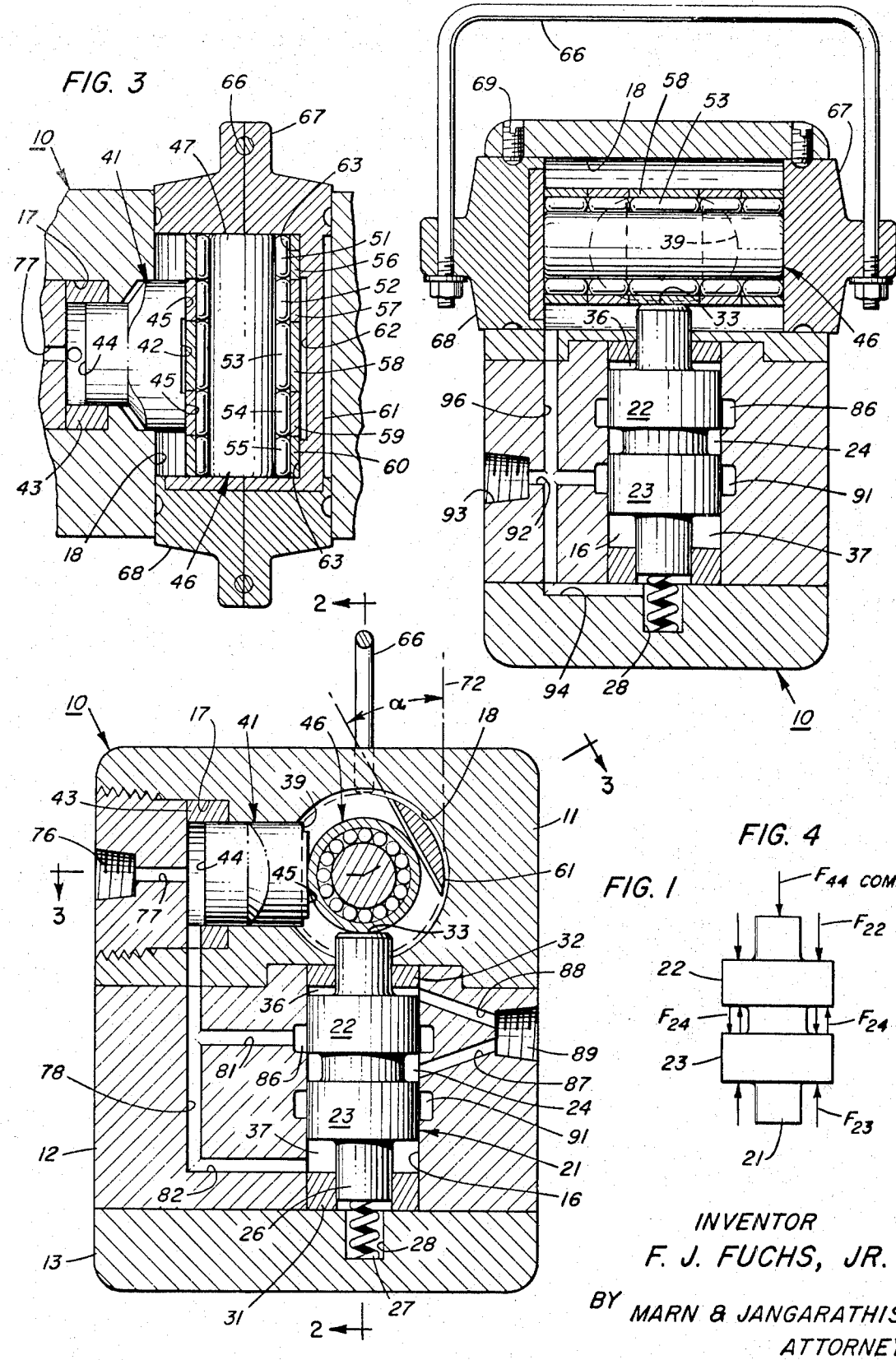
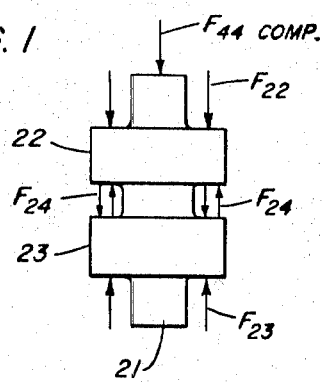

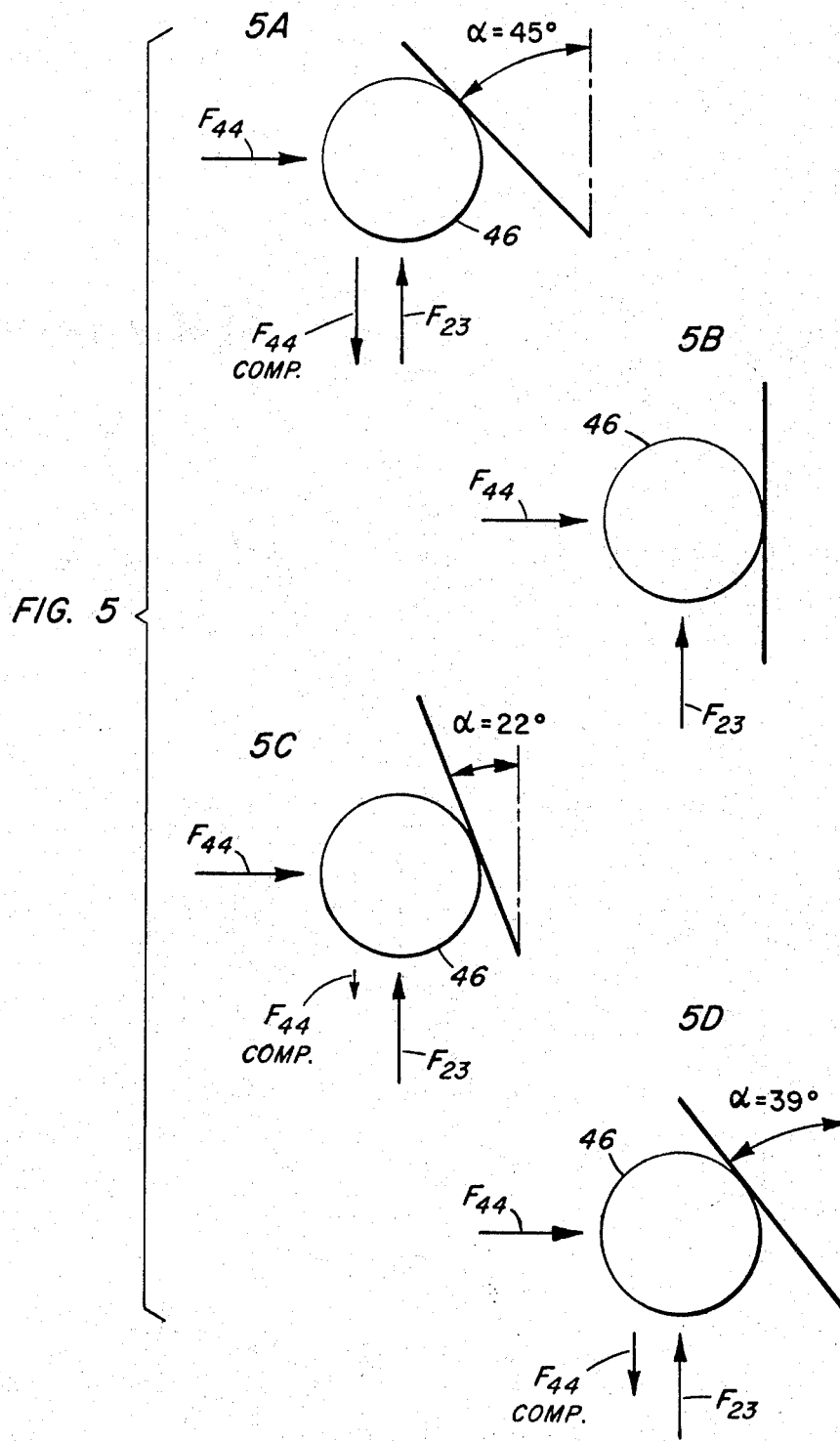

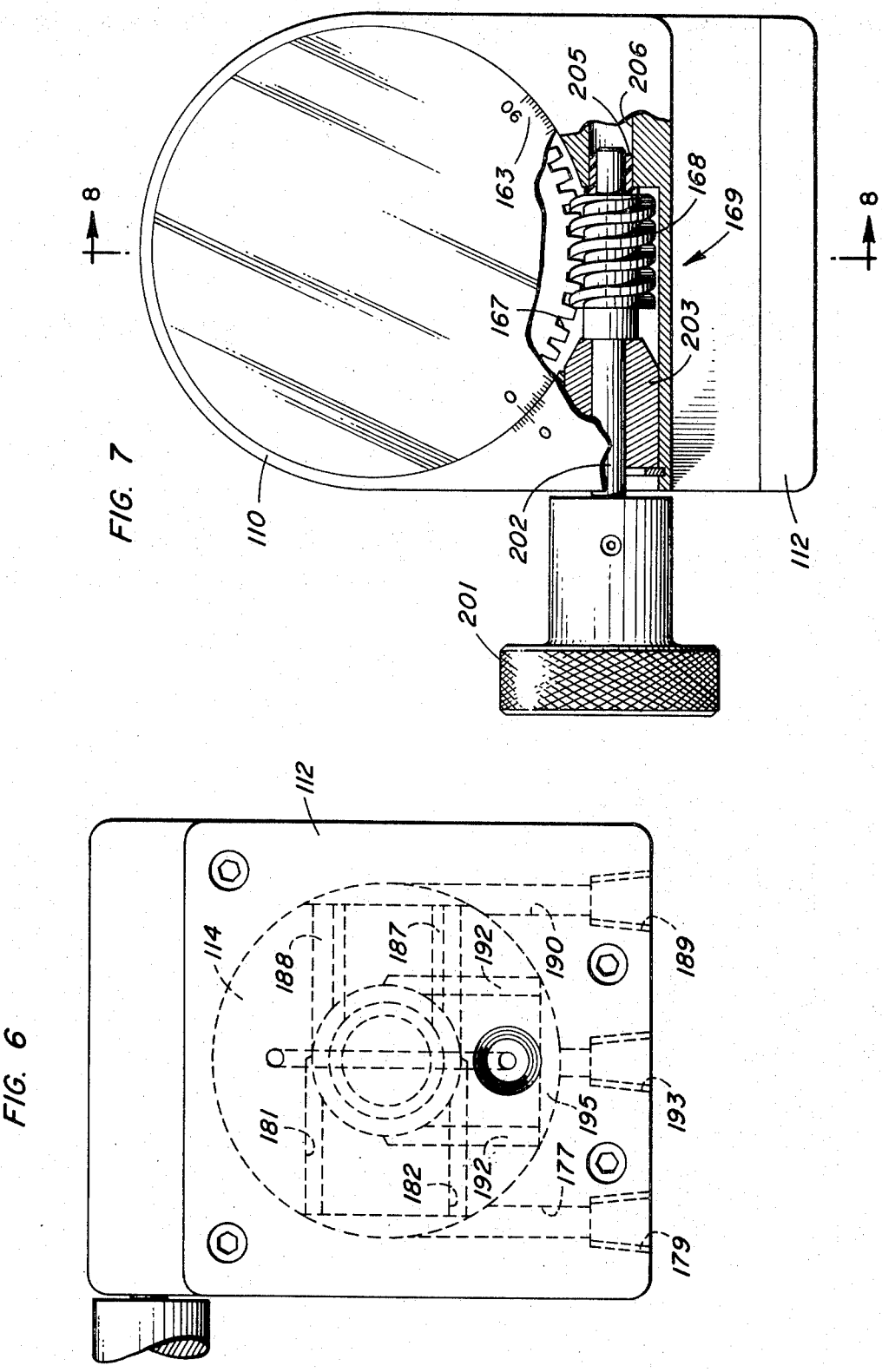

3,766,934

PRESSURE REGULATOR

CROSS-REFERENCE TO RELATED APPLICATIONS

This application is a continuation of copending application, Ser. No. 769,935, filed Oct. 23, 1968 for Pressure Regulator, now abandoned, said application, Ser. No. 769,935 being a continuation-in-part of copending application, Ser. No. 578,278, filed Sept. 9, 1966 for Pressure Regulator, now abandoned.

BACKGROUND OF THE INVENTION

In various fluid systems there is often the requirement that a predetermined ratio be maintained between two fluid pressures regardless of variations in either or both pressures. Presently known apparatus for providing such fluid pressure relationship comprises a system of fluid motors which is both complex and expensive. There is a need for a simple and inexpensive pressure regulator for providing such a fluid pressure relationship.

However, the simple and inexpensive regulators presently known to the art are of only two types; those which provide a constant system or output pressure notwithstanding variations in the source or input pressure, and those wherein a constant pressure drop is maintained between the source or input pressure and the system or output pressure, neither of which types is capable of providing a predetermined ratio between two fluid pressures regardless of variations in either or both pressures.

Accordingly, it is the object of this invention to provide a simple and inexpensive pressure regulator for maintaining a predetermined ratio between two fluid pressures regardless of variation in either or both pressures, for example, a predetermined ratio between the output pressure of the regulator, i.e., the pressure in an operational system to be served; and the input pressure to the regulator; regardless of variations in either or both the regulator input and output pressures.

A further object of the present invention is to provide such a pressure regulator wherein such ratio is selectively variable between 0 and 100 percent.

SUMMARY OF THE INVENTION

A fluid pressure regulator illustrating certain features of the present invention may include a housing having source and system ports for connection to a source of high pressure fluid and to a system to be served, respectively, and means intemediate said ports for maintaining a predetermined ratio between pressures in said source and said system notwithstanding variations in the source or the system pressures, or both.

BRIEF DESCRIPTION OF THE DRAWINGS

A more complete understanding of the present invention may be obtained from the following detailed description when read in connection with the appended drawings, wherein:

FIG. 1 is a cross-sectional, front elevational view of a first embodiment of a fluid pressure regulator constructed in accordance with the teaching of the present invention;

FIG. 2 is a cross-sectional view taken substantially through the plane 2—2 of FIG. 1 in the direction of the arrows;

FIG. 3 is a cross-sectional view taken substantially through the plane 3—3 of FIG. 1 in the direction of the arrows;

FIG. 4 is a force diagram of assistance in understanding the operation of the fluid pressure regulator or FIGS. 1 through 3;

FIG. 5 is a series of force diagrams illustrating the force vectors for various settings of the fluid pressure regulator of FIGS. 1 through 3;

FIG. 6 is a plan view of a second embodiment of a fluid pressure regulator constructed in accordance with the teaching of the present invention;

FIG. 7 is a side elevational view, partly in section, of the regulator of FIG. 6;

DETAILED DESCRIPTION

Figure 9:
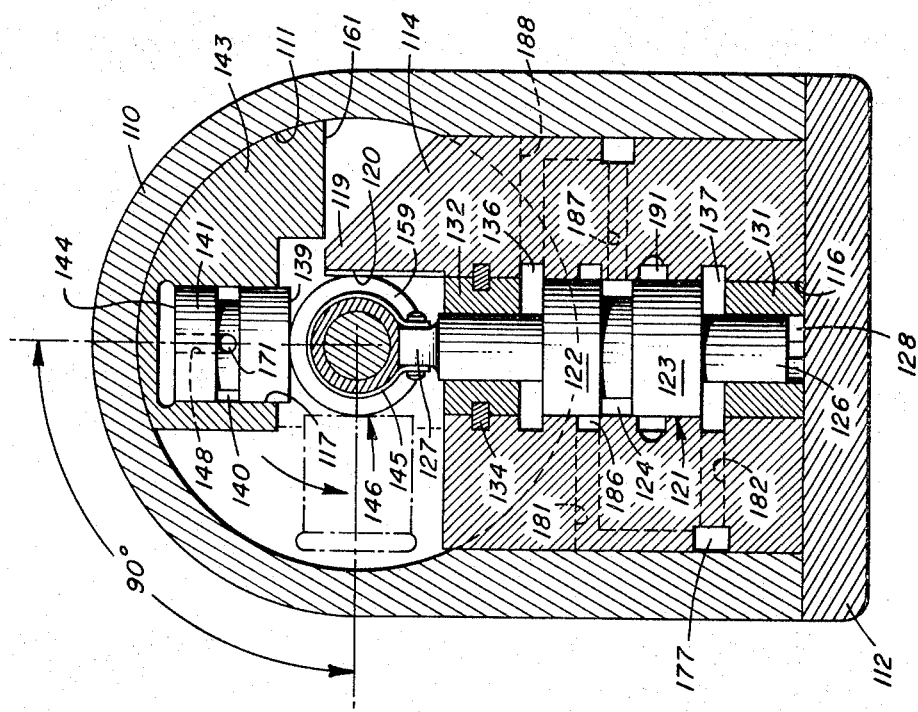
FIG. 9 is a cross-sectional, elevational view through the plane 9—9 of FIG. 8 in the direction of the arrows.

Referring to FIG. 1, there is shown a first embodiment of a pressure regulator according to the present invention including a housing 10 comprising three sections 11, 12 and 13, which are held together as a unitary structure by suitable securing means such as clamps or bolts, or by welding. Three mutually perpendicular bores 16, 17 and 18, are formed in the housing so that their center lines intersect.

A shaft 21, longitudinally slidably disposed in bushing 31 and 32 in bore 16 between uppermost and lowermost positions, has a pair of equal diameter pistons 22 and 23 mounted thereon which define a space 24 therebetween. The lower end 26 of shaft 21 is urged upwardly by a spring 27 which is mounted in a well 28 formed in housing 10. A chamber 36 is defined by bore 16, the lower surface of bushing 32 and the upper surface of piston 22. Similarly, a chamber 37 is defined by bore 16, the upper surface of bushing 31 and the lower surface of piston 23.

A piston 41 has a circular fluid end portion 44 slidably mounted in bushing 43 for reciprocation in bore 17. Working end 39 of piston 41 is generally oblong in cross-section (FIG. 2), and is relieved in the center portion thereof to define bearing surfaces 45 which cooperate with bearing sleeves 57 and 59 as will hereinafter be discussed.

A cylindrical bearing member 46, freely mounted in bore 18, is positioned therein by the action of shaft 21, piston 41 and a camming element 61 which is more fully described infra. Cylindrical bearing member 46 is, in effect, five bearings having a central rod 47 as a common inner race, five sets of longitudinally spaced roller bearing elements 51 through 55, surrounding the central rod 47 and five radially displaced cylindrical sleeves 56 through 60 as individual outer races for each of the bearings 51 through 55 respectively. As can be seen in FIGS. 1, 2 and 3, upper surface 33 of shaft 21 engages sleeve 58, bearing surfaces 45 of piston 41 engage sleeves 57 and 59, and operating surfaces 63 of camming element 61 engage sleeves 56 and 60. Thus, movement of any two of shaft 21, piston 41 or camming element 61 causes a movement in cylindrical bearing member 46.

A flat cam 61, mounted in bore 18, has a relieved center portion 62 defining operating surfaces 63 which coact with bearing sleeves 56 and 60 of cylindrical bearing member 46 (FIG. 3). A handle 66 interconnects a pair of control knobs 67 and 68 mounted respectively on the ends of cam 61 whereby the cam element can be rotated within bore 18. The knobs 67 and 68 have annular grooves formed therein which coact with recessed screws 69 threadedly mounted in housing 10 for securing the cam 61 in a desired position with respect to a reference axis 72 as best seen in FIG. 1. As is explained hereinafter, the ratio of source to system fluid pressure is determined by the angle $\alpha$ between the plane of operating surfaces 63 of cam 61 and a vertical reference line. Angles $\alpha$, between 0° and 45°, may be set by the rotation of handle 66, and a graduated scale, calibrated in source/system pressure ratio values, is proved on knob 67 to facilitate selection of a desired system to source pressure ratio.

As can best be seen in FIG. 1, an input or source port 76 is connected to bore 17 via passage 77 which is connected to a common passage 78 having two branch passages 81 and 82 connected thereto. Branch passage 81 connects with a first annular channel 86 formed in the wall of housing 10 so that it communicates with bore 16. Branch passage 82 leads into space 37 at the bottom of bore 16 so as to expose the lower surface of piston 23 to source pressure.

An output or system port 89 is connected to bore 16 via passage 87 which enters bore 16 in such a location that it is in communication with the space 24 between pistons 22 and 23 notwithstanding whether the shaft 21 is in its uppermost or lowermost positions.

A second annular channel 91 is formed in the periphery of bore 16 and is connected to an exhaust port 93 by passage 92. Exhaust 93 is also connected to well 28 and bore 18 via passages 94 and 96 to preclude a buildup of pressure in these areas from leakage or other sources.

In FIG. 1, shaft 21 is shown in an equilibrium position, i.e., pistons 22 and 23 seal off annular channels 86 and 91 respectively so that no flow of fluid through the regulator can occur. It can be seen that as shaft 21 rises, channel 86 is progressively uncovered to allow fluid at source pressure to flow into space 24 and therethrough to passage 87. As shaft 21 falls, piston 22 covers channel 86 shutting off the flow of high pressure source fluid, and as shaft 21 continues to fall, piston 23 uncovers channel 91 thus allowing fluid from the operational system to flow from passage 87 into space 24 and therethrough into channel 91 to be exhausted from the regulator through exhaust port 93. Thus it can be seen that the position of shaft 21 in bore 16 controls the flow of fluid through the regulator 10 either into or out of an operational system.

In the operation of the regulator of this invention, a source of pressurized fluid is connected to input port 76, and an operational system to be served is connected to output port 89. Thus, high pressure fluid fills passages 77, 78, 81, 82, annular channel 86 and space 37. The action of this high pressure fluid creates forces which act against the surface of end portion 44 (F44) of piston 44, and against the lower surface of piston 23 (F23) on shaft 21. The surface area of end portion 44 and the lower surface of piston 23 which are exposed to the high pressure fluid are equal. Accordingly, the forces F44 and F23 are equal. Further, fluid at outlet pressure acts upon the upper and lower surfaces of piston 22 and the upper surface of piston 23. The net effect of the force of the output pressure, therefore, is equal to that force acting upon the upper surface of piston 22 (F22) since the vectorial sum of the forces acting upon the lower surface of piston 22 and the upper surface of piston 23 is substantially zero.

As can be seen in FIG. 1, force F44 is directed against the angularly oriented surface of cam 61 and as such is redirected from a solely horizontally oriented force to a force having horizontal and vertical components. Thus, it can be seen that the axial forces acting on shaft 21 (FIG. 4) are the downwardly directed F22 and vertical component of F44, and upwardly directed F23. Thus, shaft 21 will be in a state of equilibrium when the vectorial sum of F22, F44 component and F23 is zero.

As can best be seen from the illustrations of FIG. 5, the vectorial resultant force, along the axis of shaft 21, from the action of forces F44 and F23 against bearing 46, vary according to the angle $\alpha$ which cam surfaces 63 make with respect to the vertical. Thus, in FIG. 5A, cam surfaces 63 are at an angle $\alpha$ of 45° with respect to the vertical, the axial vectorial sum of F44 and F23 is zero and the net effect against shaft 21 is zero. In FIG. 5B, cam surfaces 63 are at an angle of $\alpha$ 0° with respect to the vertical; force F44, therefore, has no vertical component and the resultant force on shaft 21 is F23 directed upwardly. Between the extremes of F44 component being equal to F23 when $\alpha$ is 45°, and F44 component being zero, when $\alpha$ is 0°, the value of the F44 component varies according to the tangent of angle $\alpha$. Thus, for any equilibrium situation:

$$F44 \tan \alpha + F22 = F23 \tag{1}$$

since F44 equals F23;

$$F23 \tan \alpha + F22 = F23 \tag{2}$$

$$F23 (1-\tan \alpha) = F22 \tag{3}$$

Looking to FIG. 5C, it can be seen that $\alpha$ is 22° and the tangent of $\alpha$ is 0.40. Therefore, equilibrium will be reached whenever system pressure is 0.60 of source pressure. Similarly, in FIG. 5D, $\alpha$ is 39° and the tangent of $\alpha$ is 0.81; accordingly, equilibrium will occur whenever system pressure is 0.19 of source pressure.

Whenever an equilibrium condition exists in the regulator, shaft 21 is positioned in bore 16 so that piston 22 covers channel 86, piston 23 covers channel 91, and there is no flow of fluid. If, however, the operational system pressure becomes greater than that dictated by a preselected source/system pressure ratio, or if source pressure is reduced for any reason, F22 plus the F44 component will be greater than F23, and shaft 21 will be displaced downwardly opening chamber 24 to channel 91, allowing sufficient operational system fluid to escape through port 93 to reduce system pressure and recover the preselected ratio equilibrium condition. Conversely, if source pressure increases, F23 will become greater than F22 plus the F44 component, the shaft 21 will be displaced upwardly, piston 22 will uncover channel 86 and source fluid will flow into the operational system through chamber 24 and passage 87 until equilibrium is once again achieved. It is to be noted that the effect of spring 27 acting on shaft 21 is considered to be negligible for purposes of establishing the force equations.

Prior to placing the pressure regulator of the present invention into operation, there being no pressure differential between inlet and outlet ports 76 and 89, shaft 21 is urged upwardly by spring 27. Consequently, piston 41 lightly engages cylindrical bearing element 46, and channel 86 communicates with space 24.

In order to activate the regulator, handle 66 is rotated to establish an angle $\alpha$ of the cam surfaces 63 which corresponds to the desired source/system pressure ratio. Recessed screws 69 are then tightened to secure cam 61 in the desired position, inlet port 76 is connected to a source of pressurized fluid, and outlet port 89 is connected to an operational system to be served. Source fluid flows through port 76 into passage 77 and bore 17 causing piston 41 to be urged against cylindrical bearing element 46. Source fluid also fills passages 78, 81, 82, annular channel 86 and space 37. The source fluid in space 37 urges shaft 21 upwardly and maintains shaft 21 in its upwardly displaced position as the operational system is being filled by the flow of source fluid through chamber 24 and passage 87 through outlet port 89. As the operational system pressure increases, the force F22 in the upper surface of piston 22 also increases, tending with the force F44 component to urge shaft 21 downwardly against the force F23. As the system reaches equilibrium shaft 21 is displaced downwardly to cover channel 86 and discontinue the charging of the operational system. Subsequent fluctuations in the ratio of source to system pressure will cause displacement of shaft 21 as described supra and the systems will be immediately returned to their preselected equilibrium pressure ratio.

If it is desired to alter the pressure source/system ratio, handle 66 may be rotated to change cam angle both during operational and non-operational periods of the regulator.

If the regulator of the present invention is to be used as a pressure reducing valve in a flowing fluid system, rather than as a pressure regulator for a closed fluid system as described above, cam 66 is set at an angle which, based upon a known input fluid pressure, establishes a desired pressure drop across the valve. Thereafter, the operation is in all respects substantially the same.

As will be recognized by those having skill in the art, there are at least some frictional forces developed in bearing member 46 as a result of its being acted upon by cam element 61, piston 41 and shaft 21. These forces of course increase with increases in the angle $\alpha$. Thus, the greatest friction occurs as the angle $\alpha$ approaches 45°, which angle corresponds to the largest amount of required pressure drop across the regulator, i.e. where system pressure is required to be a very small amount of source fluid pressure. Thus, it will be recognized that the greatest friction is present where the presence of friction is most significant with regard to the percentage relationship between the source on system pressures. Because of these frictional forces which are inherent in the relationship of the elements, the embodiment of the pressure regulator shown in FIGS. 1-3, is most useful and accurate in applications where the system pressures desired are required to be no less than about (5) percent of the amount of the source pressure.

An alternate embodiment of a pressure regulator according to the teaching of the present invention is shown in FIGS. 6 through 10. This embodiment affords close, accurate control of system pressure throughout all ratios of system to source pressure ranging from straight-through operation, where source and system pressure are equal, to virtually no-flow operation, where it is desired that system pressure be maintained at approximately 1 percent or less of source pressure. Further, this embodiment is particularly useful wherein the system pressure is required to be 5 percent or less of the source pressure. This degree of control is made possible by virtually eliminating the occasion of friction losses in the cylindrical bearing member as the regulator approaches the no-flow condition.

Referring now to FIGS. 6 through 10, there is shown a pressure regulator having a housing 110 which is suitably secured, as by bolts, to a base plate 112. A fluid passage or first block 114 (FIGS. 8 and 9) is mounted within a first cylindrical bore 113 formed in housing 110 and substantially centrally of base plate 112. Block 114 is generally cylindrical and is positioned with its longitudinal axis extending substantially perpendicularly with respect to the surface plane of base plate 112.

The upper portion of cylindrical passage block 114 is chordally relieved on two opposed sides to define vertical parallel surfaces 118 (FIG. 8) adapted to telescopically receive thereover a rotating or second block 143 which is rotatably slidably received within a second cylindrical bore 111 formed in housing 110, the center line of which intersects with the center line of first cylindrical bore 113. Extending upwardly from the upper surface of passage block 114 is a shoulder 119 (FIG. 9) having a vertical surface 120, the plane of which is perpendicular to the planes of vertical parallel surfaces 118. Vertical surface 120 defines a reaction surface for cylindrical bearing member 146 as will be further described.

Block 114 is also provided with a longitudinally, axially extending bore 116. A shaft 121, longitudinally slidably disposed between a lower bushing 131 and an upper bushing 132, has a pair of equal diameter pistons 122 and 123 formed thereon, which pistons define a space 124 therebetween. The lower end 126 of shaft 121 extends into a vented well 128 formed by bushing 131 and the upper surface of base plate 112. A chamber 136 is defined by bore 116, the lower surface of bushing 132 and the upper surface of piston 122. Similarly, a chamber 137 is defined by bore 116, the upper surface of bushing 131 and the lower surface of piston 123. Upper bushing 132 is rigidly positioned within bore 116 by a retainer ring 134 which is received in complementary annular channels in the bushing and in the bore.

A piston 141 is reciprocably mounted within a bore 117 of the rotating block 143. Piston 141 is provided with an annular channel 140 in its circumferential periphery, which channel is disposed longitudinally between a fluid end portion 144 and a working end portion 139. Channel 140 is in communication with a passage 171 through which fluid at source pressure is provided. Thereafter, fluid at source pressure is transmitted from channel 140, through passage 148 in piston 141, to that portion of bore 117 above the fluid end 144 of the piston. In this manner, fluid at source pressure exerts a force against the fluid end 144 of the piston, which force is transmitted through the piston to be exerted against a cylindrical bearing element 146 by working end 139.

Figure 8:
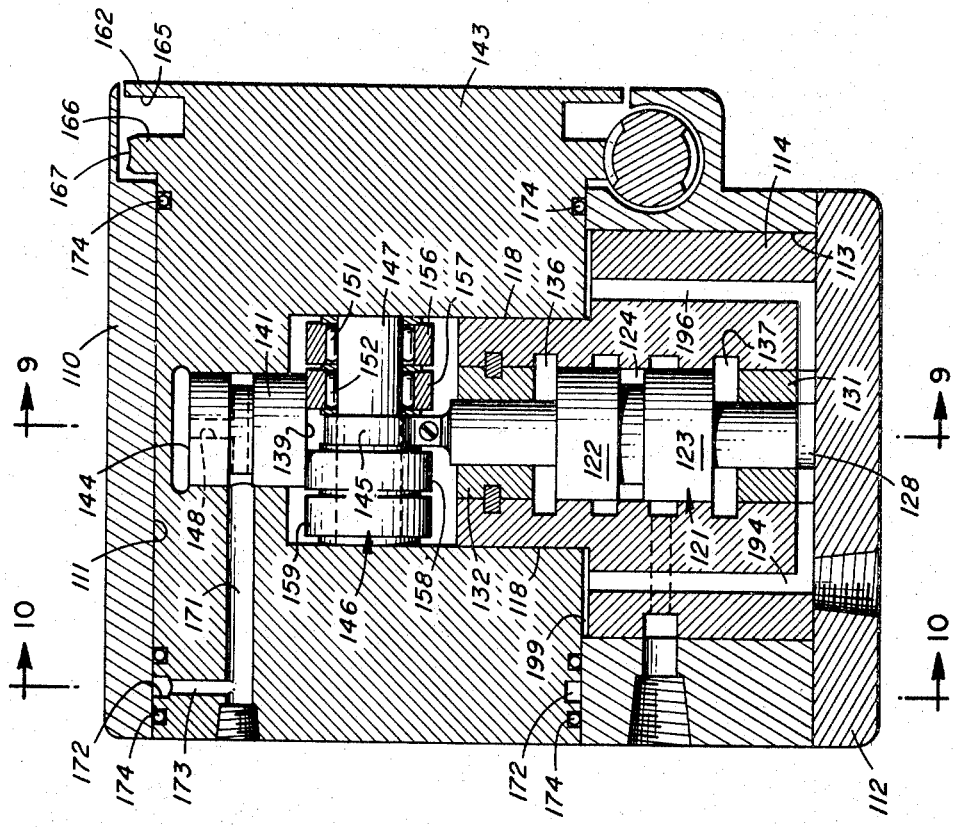
FIG. 8 is a cross-sectional, elevational view through the plane 8—8 of FIG. 7 in the direction of the arrows.

The cylindrical bearing element, designated generally by reference numeral 146, is secured by a suitable bolted strap 145 to a boss 127 formed on the top shaft 121, and bears against both the working end 139 of piston 141, and the vertical surface 120 of shoulder 119. Cylindrical bearing element 146, is in effect, four bearings having a central rod 147 as a common inner race. Four sets of roller bearing elements 151 through 154 (153 and 154 not being shown) surround said rod and are spaced longitudinally, with two sets each being on opposite sides of strap 145. Each of the sets of roller bearing elements 151 through 154 are enclosed by a cylindrical sleeve, 156 through 159, which sleeves act as individual outer races for each of the bearing elements 151 through 154, respectively. As can be seen in FIG. 8, the cylindrical sleeves 157, 158 of bearing element 146 engage the working surface 139 of piston 141. As best seen in FIG. 9, the cylindrical sleeves 156, 159 (only 159 being shown) of bearing element 146 engage the surface 120 of shoulder 119 which surface is centrally relieved to preclude contact with cylindrical sleeves 157, 158.

Figure 10:
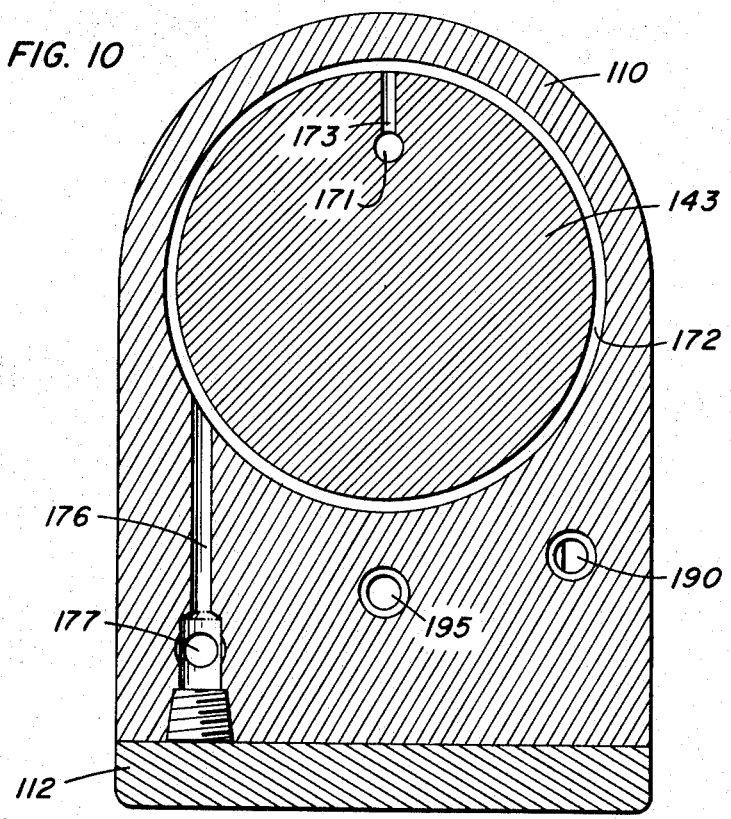
FIG. 10 is a cross-sectional, elevational view through the plane 10—10 of FIG. 8 in the direction of the arrows.

Rotating block 143 is rotatably mounted within bore 111 of housing 110 and comprises a generally solid member (FIG. 8) having a generally circular cross-section (FIGS. 7, 9 and 10). The central portion of block 143 is relieved to define a space 161 (FIG. 8), having a generally rectangular cross-section, for receiving bearing member 146 and the upper portion of passage block 114. An outwardly, radially extending shoulder 162 is formed on one end of block 143, whereupon is provided a scale 163 (FIG. 7) for use in determining the angular position of block 143 within housing 110. Longitudinally inwardly from shoulder 162, and spaced therefrom by an annular channel 165, is a radially outwardly extending shoulder 166. The outer surface of shoulder 166 is provided with teeth 167 which cooperate with the worm gear 168 of a block positioning mechanism, designated generally by the reference numeral 169, to be discussed.

Extending radially outwardly from the base portion of relieved space 161 in block 143 is the aforementioned bore 117 for slidably receiving piston 141. Passage 171, which as noted above provides source fluid to piston 141, extends longitudinally inwardly to bore 117 from the other end of block 143, i.e. that end opposed to the aforesaid one end having shoulder 162 formed thereon. An annular channel 172, formed around around the periphery of and disposed adjacent the other end of rotating block 143, is in communication with passage 171 through a radially extending passage 173. As is shown in FIG. 10, channel 172 communicates with a passage 176 which in turn communicates with a passage 177 in housing 110, passage 177 communicating with a threaded tapered opening 179 (FIG. 6) for connecting valve body 110 to a suitable source of input fluid (not shown). Source (input) fluid is provided to bore 117 through the aforedescribed passage arrangement, i.e. passages 177 and 176, channel 172, and thereafter passages 173 and 171, so that source fluid is available to bore 117. Thus, notwithstanding the relative angular position of block 143 in bore 11, passage 173 always communicates with channel 172, which is always in communication with passage 176.

Referring to FIG. 8, a plurality of O-ring seals 174 are provided in annular channels 175 formed in rotating block 143. The seals 174 are provided as required to preclude leakage of fluid from the regulator.

As is best seen in FIG. 6, passage 177 continues through housing 110 into passage block 114. Two branch passages 181 and 182 are formed in passage block 114 for communicating passage 177 with a radially outwardly extending first annular channel 186 (FIG. 9) formed in the surface of bore 116, and chamber 137, respectively. Thus, it can be seen that source (input) fluid is available to bore 117, chamber 137, and first annular channel 186 through the aforedescribed passages at all times during the operation of the valve.

In order to accommodate the connection of the regulator to a system to be secured, a threaded system (output) port 189 is provided in housing 110. System port 189 is connected to bore 116 via system passage 190 and branch passages 187 and 188. Branch 187 enters bore 116 in such a location that it is in communication with space 124 between pistons 122 and 123 notwithstanding whether the shaft 121 is in its uppermost or lowermost positions. Branch passage 188 provides for fluid at system (output) pressure to be introduced to chamber 136 above piston 122 so as to exert system pressure against the upper surface of piston 122 as will be hereinafter discussed.

A second annular channel 191 is formed in the periphery of bore 116 and is connected to a threaded, tapered exhaust port 193 by a pair of exhaust passages 192 feeding into a common exhaust passage 195. Exhaust port 193 is also connected to vented well 128 and spaces 199 (FIG. 8) between passage block 114 and rotating block 143 by exhaust passages 194 and 196 which are in communication with common exhaust passage 195.

As noted above, the annular shoulder 166 on rotating block 143 is provided with teeth 167 which cooperate with the worm gear 168 of a block positioning mechanism 169.

In addition to worm gear 168, block positioning mechanism 169, as best seen in FIG. 7, comprises a knurled knob 201 which is rigidly secured to a shaft 202 on which worm gear 168 is mounted. Shaft 202 is rotatably received within a bushing 203 which is mounted in a bore 204 in housing 110. Shaft 202 extends through worm gear 168 and its extended end is rotatably received within a suitable sleeve bearing 205 which is provided in a bore 206 formed in housing 110. Rotation of knob 201 causes rotation of shaft 202 and therewith worm gear 168. Worm 168 cooperates with teeth 167 on annular shoulder 166 to rotate block 143 either clockwise or counter-clockwise as required. The angular position of block 143 within housing 110 is determinable from a 90° scale 163 which is suitably provided on the outer face of shoulder 162, and which cooperates with a complementary vernier 164 on the face of housing 110.

In FIGS. 8 and 9, shaft 121 is shown in an equilibrium postion, i.e. pistons 122 and 123 seal off annular channels 186 and 191 respectively so that no flow of fluid through the regulator can occur. It can be seen that when shaft 121 rises, channel 186 is progressively uncovered to allow fluid at source pressure to flow therefrom into space 124 and therethrough to passages 187 and 190 and out the system port 189. When shaft 121 falls, piston 122 covers channel 186, shutting off the flow of source (input) fluid, and as shaft 121 continues to fall, piston 123 uncovers channel 191 thus allowing fluid from the system to flow from passage 187, through space 124 and into channel 191 to be exhausted from the regulator through exhaust port 193. Thus, as was the case with respect to the pressure regulator of FIGS. 1 through 4, the position of shaft 121 in bore 116 controls the flow of fluid through the regulator 10 either into or out of the operational system.

In the operation of the embodiment of FIGS. 6-10 of the pressure regulator of this invention, a source of pressurized fluid is connected to input port 179 and an operational system to be served is connected to output port 189. Thus, high pressure fluid creates forces which act against end surface 144 of piston 141 (F144) and against the lower surface of piston 123 (F123) on shaft 21. The areas of surface 144 and the lower surface of piston 123 are equal. Accordingly, the forces F144 and F123 are equal. Further, fluid at system or output pressure acts upon the upper and lower surfaces of piston 122 and the upper surface of piston 123. The net effect of the force of the output pressure, therefore, is equal to that force acting upon the upper surface of piston 122 (F122) since the vectorial sum of the forces acting upon the lower surface of piston 122 and the upper surface of piston 123 is zero.

As can be seen in FIG. 9, the axis of reciprocation of piston 141 and therewith the vector of force 144, may be angularly directed against the surface 120 of shoulder 119. This occurs whenever the axis of reciprocation of piston 141 is not aligned with the axis of bore 116. Assuming that the axis of bore 116 is vertical, force F144 is effectively divided into a horizontal and a vertical component, the vertically directed F144 component acting axially downwardly against shaft 121. Thus, it can be seen that the axial forces acting on shaft 121 are the downwardly directed F122 and the F144 component and the upwardly directed F123. Thus, shaft 121 is in a state of equilibrium when the vectorial sum of F122, F144 component and F123 is zero.

Figure 11:
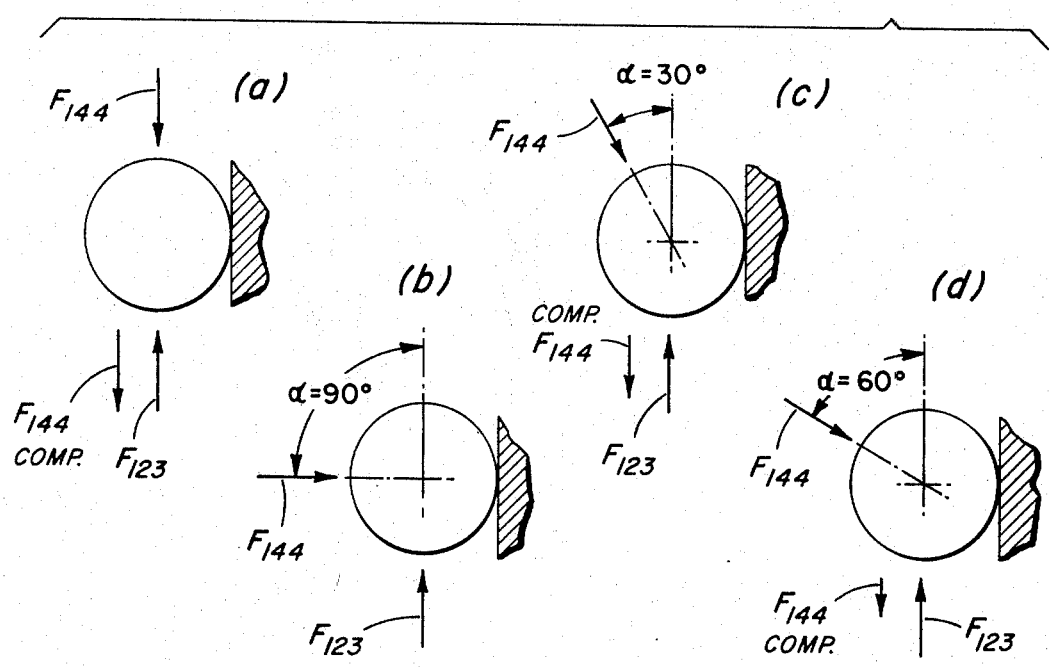
FIG. 11 is a series of force diagrams illustrating the force vectors for various settings of the fluid pressure regulator of FIGS. 6–10.

As can be seen from the illustration of FIG. 11, the vectorial resultant force, along the axis of shaft 121, from the action of forces F144 and F123 against bearing 146, varies according to the angle which the longitudinal axis of piston 141 or bore 117 makes with the axis of bore 116. Thus, in FIG. 11(a), piston 141 (with rotating block 143) is at an angle $\alpha$ of 0° with respect to the vertical, the axial vectorial sum of the vertical component of F144 and F123 is zero, and the net effect against shaft 121 is zero. In FIG. 5(b), piston 141 is at an angle $\alpha$ of 90° with respect to the axis of bore 116; force F144, therefore, has no vertical component of F144 (which is zero) and F123 on shaft 121 is F123 acting directly upwardly. Between the extremes of the F144 component being equal to F123 when $\alpha$ is 0°, and F144 component being zero when $\alpha$ is 90°, the value of the F144 component varies according to the cosine of angle $\alpha$. Thus, for any equilibrium situation:

$$F144 \text{ cosine } \alpha + F122 = F123, \quad (4)$$

and since F144 equals F123;

$$F123 \text{ cosine } \alpha + F122 = F123 \quad (5)$$

$$F123 (1 - \text{cosine } \alpha) = F122 \quad (6).$$

Looking to FIG. 5(c), it can be seen that $\alpha$ is 30°. The cosine of $\alpha$ is 0.86, therefore, equilibrium is reached whenever system pressure is .14 of the source pressure. Similarly, in FIG. 5(d), $\alpha$ is 60°. The sine of $\alpha$ is 0.50, accordingly, equilibrium occurs whenever the system pressure is 0.50 of the source pressure.

As was the situation with respect to the embodiment of FIGS. 1-4, whenever an equilibrium condition exists in the regulator, shaft 121 is positioned in bore 116 so that piston 122 covers annular channel 186, piston 123 covers anular channel 191, and there is no flow of fluid. If, however, the operational system pressure becomes greater than that dictated by the preselected system/source pressure ratio, or if source pressure is reduced for any reason, the sum of F122 plus the F144 component becomes greater than F123, and shaft 121 is displaced downwardly opening space 124 to channel 191, thereby allowing sufficient operational system fluid to escape through port 193 to reduce system pressure and recover the preselected ratio equilibrium condition. Conversely, if source pressure increases, F123 becomes greater than F122 plus the F144 component, shaft 121 is displaced upwardly, piston 122 uncovers the channel 186 and source fluid flows into the operational system through space 124 and passages 187, 190 until equilibrium is once again achieved.

In order to initially activate the regulator of the present invention, knob 201 of block positioning mechanism 169 is rotated to establish an angle between the longitudinal axis of piston 141 and the longitudinal axis of bore 116, which angle corresponds to the desired system/source pressure ratio. Input port 179 is connected to a source of pressurized fluid, and output port 189 is connected to an operational system to be served. Source fluid flows through port 179 through passage 171, channel 172, passages 173, 176, 177, 181, and 182 into bore 117, channel 186 and chamber 137, thus causing shaft 121 to be urged upwardly. Shaft 121 is maintained in the upward position while the operational system is being filled by the flow of source fluid from annular channel 186 through space 124 and passages 187 and 190, to output port 189. As the operational system pressure increases, F122 on the upper surface of piston 122 also increases, tending with the force F144 component, to urge shaft 121 downwardly against the force F123. As the system reaches equilibrium, shaft 121 is psitioned sufficiently downwardly to cover channel 186 and discontinue the charging of the operational system. Subsequent fluctuations in the ratio of source to system pressure cause displacement of shaft 121 as described *supra* with respect to the embodiment of FIGS. 1 through 4, and the systems are immediately returned to their preselected equilibrium pressure ratio.

If it is desired to alter the system/source pressure ratio, block positioning mechanism 169 may be operated to rotate block 143 and change angle both during operational and non-operational periods of the regulator. As noted above with respect to the regulator embodiment of FIGS. 1–4, the present regulator may be used as a flow pressure reducing valve.

Although the operation of the regulator has been described incrementally, it is to be understood that the device has a short response time to changes in the pressure source/system ratio. Further, as is obvious from the drawings and specification, the regulator is relatively simple and inexpensive in comparison to known systems for reliably accomplishing the same function.

Obviously, many modifications and variations of the present invention are possible in the light of the above teachings. It is therefore to be understood that the invention may be practiced otherwise than as specifically described.

What is claimed is:

1. A fluid pressure regulator comprising:
   a housing having source and system ports for connection to a source of high pressure fluid and a system to be served, respectively;
   first, second and third cylinders formed in said housing, the center line of each being perpendicular to the others;
   first flow interrupting means for interrupting a flow of fluid from said source port to said system port; and
   means mounted in said first, second and third cylinders for moving said first flow interrupting means into and out of flow interrupting position in response to deviations from a preselected ratio between source and system fluid pressures.

2. The fluid pressure regulator as claimed in claim 1 and further including:
   an exhaust port in said housing for connection to an exhaust system;
   second flow interrupting means for interrupting a flow of fluid from said system port to said exhaust port, and wherein said means mounted in said first, second and third cylinders also moves said second flow interrupting means into and out of flow interrupting position in response to deviations from a preselected ratio between source and system fluid pressures.

3. The fluid pressure regulator as claimed in claim 1 wherein said first flow interrupting means is a piston mounted on said means mounted in said second cylinder.

4. A fluid pressure regulator comprising:
   a housing having source, system and exhaust ports for connection to a source of high pressure fluid, a system to be served and an exhaust system, respectively;
   first, second and third cylinders formed in said housing, the center line of each being perpendicular to the others;
   a first piston longitudinally slidably mounted in said first cylinder, said first piston being exposed at one end to fluid at source pressure, the other end being operably received in said third cylinder;
   a shaft longitudinally slidably mounted in said second cylinder, said shaft having a lower radial surface exposed to fluid at source pressure, an intermediate radial surface exposed to fluid at system pressure, and an upper surface operably received in said third cylinder;
   means mounted in said third cylinder in operative engagement with said first piston and said shaft to redirect a component of force exerted by said first piston axially along said shaft;
   first flow interrupting means for interrupting a flow of fluid between said source port and said system port;
   second flow interrupting means for interrupting a flow of fluid between said system port and said exhaust port;
   said first piston, said shaft and said means mounted in said first, second and third cylinders, respectively, comprising means for moving said first and second flow interrupting means into and out of flow interrupting position in response to deviations from a pre-selected ratio between source and system fluid pressures.

5. The fluid pressure regulator of claim 4 wherein said means mounted in said third cylinder is a bearing member cooperating with a cam surface.

6. The fluid pressure regulator of claim 5 wherein said cam surface is selectively rotatably mounted in said third cylinder to allow variation of the cam surface angle relative to vertical to selectively vary the value of said redirected force component.

7. The fluid pressure regulator of claim 5 wherein said bearing member comprises a plurality of bearing sections mounted on a common inner race, each of said bearing sections in cooperative engagement with one of said first piston, said shaft and said cam surface.

8. The fluid pressure regulator of claim 5 wherein each of said first and second flow interrupting means are pistons mounted on said shaft.

9. A fluid pressure regulator, comprising:
   a housing having source, system, and exhaust ports for connection to a source of high pressure fluid, a system to be served, and to an exhaust system, respectively;
   a shaft slidably mounted in a cylinder in the housing, the position of said shaft within the cylinder being determined by the vectoral sum of forces acting thereon, movement of the shaft in one direction controlling facilities for venting the system port to the exhaust port, movement in the other direction controlling facilities for applying source pressure to the system port;
   adjustable means for deriving a force which in magnitude is a trigonometric function of the source pressure and applying this force in said one direction to the shaft;
   means for applying the system pressure to the shaft in said one direction; and
   means for applying source pressure to the shaft in the opposite direction.

10. A fluid pressure regulator according to claim 9 wherein said adjustable means derive and apply a force which in magnitude is a tangent function of the source pressure.

11. A fluid pressure regulator according to claim 9 wherein said adjustable means derive and apply a force which in magnitude is a cosine function of the source pressure.

12. A fluid pressure regulator comprising:
   means providing first, second and third fluid ports;
   means providing a first pressurized fluid flow path from said first port to said second port, and providing a second pressurized fluid flow path from said second port to said third port;

force receiving means including: (i) first flow varying means for varying a flow of pressurized fluid through said first flow path, and (ii) second flow varying means for varying a flow of pressurized fluid through said second flow path;

said force receiving means receiving pressuried fluid present at said first port and developing from said pressurized fluid a first force acting on said force receiving means;

variable means for receiving said pressurized fluid present at said first port and for developing from said pressurized fluid at said first port a second force which has a predeterminable relationship to said first force, said variable means applying said second force to said force receiving means;

said first and second forces acting in opposition on said force receiving means;

said force receiving means receiving pressurized fluid present at said second port and developing from said pressurized fluid present at said second port a third force acting on said force receiving means in opposition to said first force and cumulatively with said second force; and said force receiving means responsive to variations in the ratio of said first force to said second and third forces to control the operation of said first and second flow varying means to vary the flow of pressurized fluid through said first and second flow paths so as to maintain a predetermined ratio between said pressurized fluid present at said first port and said pressurized fluid present at said second port;

said variable means for developing said second force including a rotatable element rotatable through a plurality of angles $\alpha$ measured from the vertical and varying between 0° and 45°, and wherein said predetermined relationship between said first and second forces is defined by second force = first force $x$ tan $\alpha$.

13. A fluid pressure regulator according to claim 12 wherein said variable means further includes a reciprocably mounted piston for receiving pressurized fluid present at said first port and for developing from said pressurized fluid a fourth force equal to said first force, and wherein said rotatable element is a rotatable camming element for receiving said fourth force and for providing said second force by deflecting a predetermined portion of said fourth force against said force receiving means, said camming means deflecting said predetermined portion of said fourth force in accordance with the tangent of said angle $\alpha$.

14. A fluid pressure regulator comprising:

means providing first, second and third fluid ports;

means providing a first pressurized fluid flow path from said first port to said second port, and providing a second pressurized fluid flow path from said second port to said third port;

force receiving means including: (i) first flow varying means for varying a flow of pressurized fluid through said first flow path, and (ii) second flow varying means for varying a flow of pressurized fluid through said second flow path;

said force receiving means receiving pressurized fluid present at said first port and developing from said pressurized fluid a first force acting on said force receiving means;

variable means for receiving said pressurized fluid present at said first port and for developing from said pressurized fluid at said first port a second force which has a predetermined relationship to said first force, said variable means applying said second force to said force receiving means;

said first and second forces acting in opposition on said force receiving means;

said force receiving means receiving pressurized fluid present at said second port and developing from said pressurized fluid present at said second port a third force acting on said force receiving means in opposition to said first force and cumulatively with said second force; and said force receiving means responsive to variations in the ratio of said first force to said second and third forces to control the operation of said first and second flow varying means to vary the flow of pressurized fluid through said first and second flow paths so as to maintain a predetermined ratio between said pressurized fluid present at said first port and said pressurized fluid present at said second port;

said variable means for developing said second force including a rotatable element rotatable through a plurality of angles $\alpha$ measured from the vertical and varying between 0° and 90°, and wherein said predetermined relationship between said first and second forces is defined by second force = first force x cosine $\alpha$.

15. A fluid pressure regulator according to claim 14 wherein said variable means further includes a stationary, vertical reaction surface, and wherein said rotatable element is a reciprocably mounted piston for receiving pressurized fluid present at said first port and for developing a fourth force equal to said first force and wherein said reaction surface and said piston cooperate to provide said second force by deflecting a predetermined portion of said fourth force against said force receiving means, said reaction surface deflecting said predetermined portion of said fourth force in accordance with the cosine of said angle $\alpha$.

16. A fluid pressure regulator comprising:

a. a housing having source, system and exhaust ports for connection to a source of high pressure fluid, a system to be served and an exhaust system, respectively;

b. a first block 143 mounted in said housing and having a bore formed therein;

c. a second block 114 mounted in said housing and having a bore formed therein;

d. first flow interrupting means for interrupting a flow of fluid from said source port to said system port;

e. means mounted in and between said bores in said first and second blocks for moving said first flow interrupting means into and out of flow interrupting position in response to deviations from a preselected ratio between source and system fluid pressures to thereby maintain said pre-selected ratio;

f. said first block 143 being rotatable within said housing for selecting said ratio between source and system fluid pressures.

17. A fluid pressure regulator comprising:

a. a housing having source, system and exhaust ports for connection to a source of high pressure fluid, a system to be served and an exhaust system, respectively;

b. a first block 143 mounted in said housing and having a bore formed therein;

c. a second block 114 mounted in said housing and having a bore formed therein;
d. first flowing interrupting means for interrupting a flow of fluid from said source port to said system port;
e. means mounted in and between said bores in said first and second blocks for moving said first flow interrupting means into and out of flow interrupting position in response to deviations from a preselected ratio between source and system fluid pressures to thereby maintain said pre-selected ratio;
f. second flow interrupting means for interrupting a flow of fluid from said system port to said exhaust port, and wherein said means mounted in and between said bores in said first and second blocks are also for moving said second flow interrupting means into and out of flow interrupting position in response to deviations from said preselected ratio between source and system fluid pressures;
g. said means mounted in and between said bores comprising:
   i. a piston mounted in the bore of said first block;
   ii. a shaft mounted in the bore of said second block; and
   iii. a force transmitting means mounted between said piston and said shaft;
h. said first block and piston mounted therein being rotatable within said housing for selecting said ratio between source and system fluid pressure.

* * * * *

UNITED STATES PATENT OFFICE
CERTIFICATE OF CORRECTION

Patent No. 3,766,934     Dated October 23, 1973

Inventor(s) FRANCIS JOSEPH FUCHS, JR. Case-87

It is certified that error appears in the above-identified patent and that said Letters Patent are hereby corrected as shown below:

Title page under References Cited UNITED STATES PATENTS add the following: --2,285,540  6/1942  Stein et al ... 137/85 UXR; 2,944,559  7/1960  Rumsey ... 137/85;  2,958,337  11/1960 Holbrook ... 137/85 X;  3,384,102  5/1968  Hickox ... 137/85.--.

Column 2, line 5, "or" should read --of--.
Column 3, line 38, "Exhaust 93" should read --Exhaust port 93--; line 65, "piston 44," should read --piston 41,--.
Column 5, line 33, "equilibrium" should read --equilibrium,--; line 62, "greatest" should read --greater--.
Column 6, line 3, "(5) percent" should read --five (5) percent--.
Column 7, line 37, "whereupon" should read --whereon--; line 54, "around around" should read --around--; line 67, "bore 11," should read --bore 111,--.
Column 10, line 55, "psitioned" should read --positioned--.
Column 12, claim 9, line 40, "vectoral" should read --vectorial--.
Column 13, claim 12, line 6, "pressuried" should read --pressurized--; line 13, "predeterminable" should read --predetermined--.
Column 15, claim 17, line 3, "flowing" should read --flow--.

Signed and sealed this 4th day of June 1974.

(SEAL)
Attest:

EDWARD M. FLETCHER, JR.
Attesting Officer

C. MARSHALL DANN
Commissioner of Patents